Patented Aug. 4, 1936

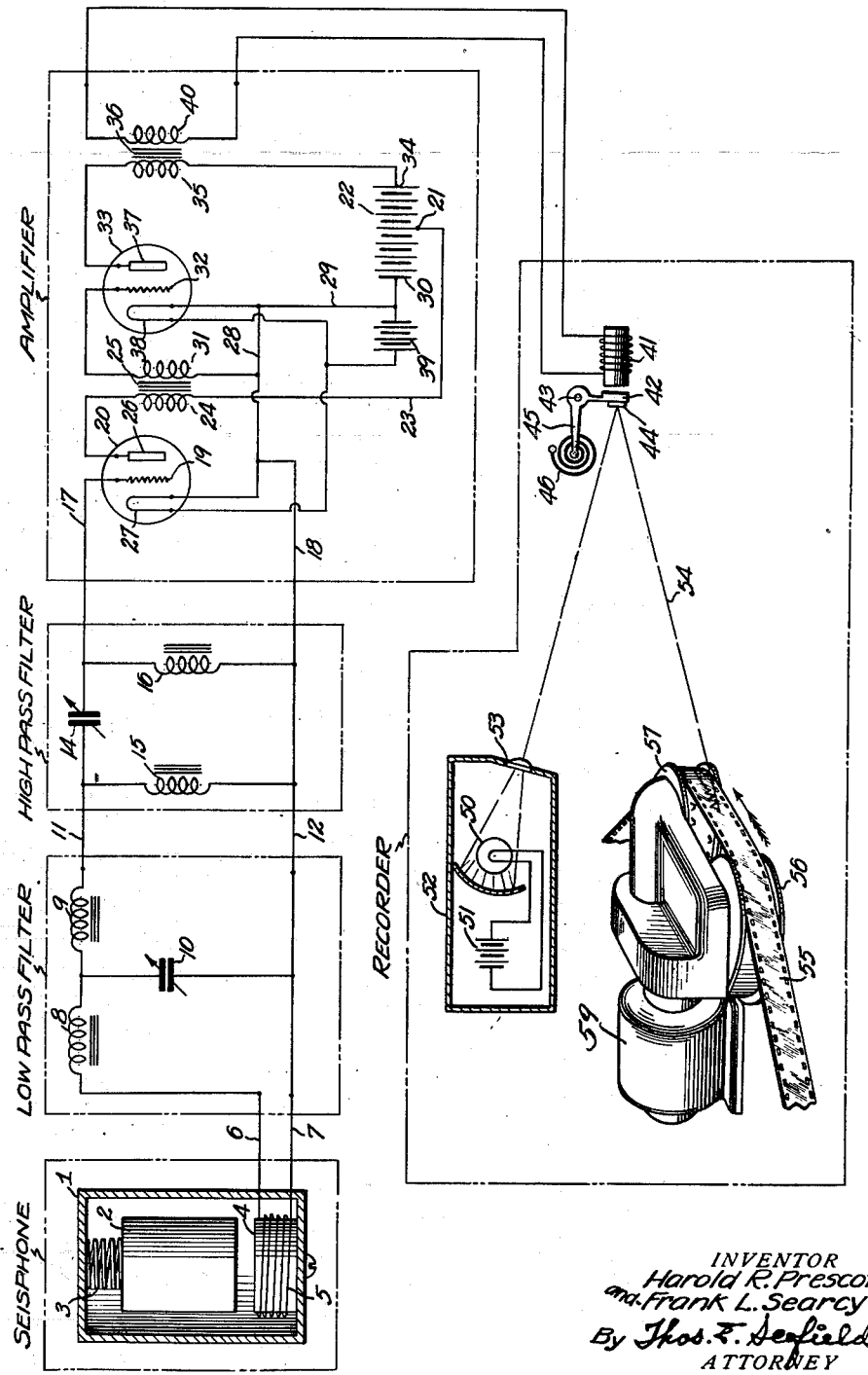

2,049,724

UNITED STATES PATENT OFFICE 2,049,724

METHOD OF GEOLOGICAL EXPLORATION

Harold R. Prescott and Frank L. Searcy, Ponca City, Okla., assignors to Continental Oil Company, Ponca City, Okla., a corporation of Delaware Application February 5, 1934, Serial No. 709,899

4 Claims. (Cl. 181—0.5)

Our invention relates to a method of geological exploration and more particularly to a means and method for investigating the geological strata below the surface of the earth by using earth vibrations generated for that purpose.

One method of making geological explorations comprises creating earth vibrations by detonating an explosive at or near the surface of the earth and recording the vibrations after they have been influenced by the various geological strata. In generating earth vibrations, a great many oscillations are set up. Some of these vibrations are useful in the art of seismological exploration and others are of no value and, in many instances, make the results obtained, of little value.

The earth's crust has, as a rule, a weathered layer of material which is not as compact and as uniform in physical characteristics as the material and geological layers beneath which have been protected and not subjected to weathering action. When an explosive charge is detonated, low frequency vibrations of large amplitude are set up in the weathered layer. These vibrations are of no use in determining the depth, slope, or character of the underlying strata, and may mistake or camouflage to a large extent the vibrations which arrive from the strata below.

The vibrations from the underlying strata are of higher frequency than the vibrations caused in the layers near the surface and particularly in the weathered layer. Wind, the natural unrest of the earth, extraneous vibrations due to traffic, railroad movements, large pieces of machinery and the like, generate vibrations which are higher in frequency than the vibrations occasioned by underlying geological strata.

When earth vibrations have been generated, a seisphone will receive the low frequency vibrations generated and transmitted in the geological layers near the surface of the earth. It will also receive a group of intermediate frequency vibrations reflected from or caused in the underlying geological layers. The high frequency vibrations generated and transmitted in the earth due to wind, the natural unrest of the earth, and extraneous vibrations, will also be received by the seisphone. Frequently, the various vibrations are so commingled and confused that accurate results cannot be obtained by a reading of a record of the seisphone vibrations.

One object of our invention is to provide a method of geological exploration in which substantially only the useful and desirable intermediate frequency vibrations which are transmitted from the underlying geological strata are recorded.

Another object of our invention is to provide a means for rejecting the undesirable low frequencies and the undesirable high frequencies which are picked up by the seisphone, and recording only the useful intermediate frequencies.

Further and other objects of our invention will appear from the following description.

The accompanying drawing is a diagrammatic view of one arrangement capable of carrying out the method of our invention.

In general, our invention contemplates the generation of electromotive forces in sympathy with the vibrations of the earth after elastic waves have been produced. The high frequency currents produced are rejected. The low frequency currents are rejected. The intermediate frequency currents are amplified and recorded in any suitable manner. The figure is a diagrammatic view of one form of apparatus capable of carrying out the process of my invention.

More particularly referring now to the drawing, a charge of explosive is detonated, causing elastic waves to travel from the point of disturbance in all directions. It is to be understood that, while we prefer to use explosives, that any other suitable method of causing elastic waves or vibrations may be employed. A seisphone, which may be of any suitable construction, as for example a frame 1 in which a heavy magnet 2 is resiliently suspended by means of spring 3, carries a core 4, secured thereto. Around the core is wound a coil 5. Normally, lines of magnetic flux from the magnet 2 will pass through the core 4. As the earth vibrates, the magnet 2, having a large mass, will tend to remain stationary in space, while the frame 1 carrying core 4 will move relative to the magnet 2 in phase with the vibrations of the earth. The movement of magnet 2 will cause a change of the path of magnetic flux through core 4 causing the windings of coil 5 to cut the moving magnetic lines of force. This will generate the various electromotive forces in coil 5. The coil 5 is connected to a low pass filter by means of conductors 6 and 7. The low pass filter comprises inductance coils 8 and 9, and a variable capacity 10. The undesirable high frequencies will be bypassed through condenser 10, the capacity of which may be varied to adjust it to bypass undesirable high frequencies. The low pass filter is connected to a high pass filter by means of conductors 11 and 12. In the high pass filter, undesirable low frequencies are rejected and the desired intermediate frequencies pass through variable capacity 14. The principle upon which the filters operate is believed to be well understood. High frequencies will pass through capacities more readily than through inductances, while low frequencies will pass through inductances more readily than through capacities. The undesirable high frequencies are removed by the low pass filter. The undesirable low frequencies are removed in the high pass filter, which, in addition to variable capacity 14, comprises inductances 15 and 16, through which the rejected low frequencies are shunted. Conductors 17 and 18 connect the high pass filter through an amplifying unit, which may consist of a plurality of thermionic tubes. The drawing illustrates the use of two tubes, though it is to be understood that any number of tubes may be employed, as desired.

The filtered electromotive forces are impressed upon the grid 19 of the first tube 20. The plate current in the first tube 20 is from positive pole 21 of the battery 22, through conductor 23, through primary coil 24 of the transformer 25, to the plate 26, to the filament 27, through conductors 28 and 29 to the negative side 30 of the battery 22. It will be readily understood that the fluctuations of grid voltage will cause low fluctuations of the plate current, which fluctuations are picked up by the secondary coil 31 of the transformer 25 and impressed upon the grid 32 of tube 33. The plate current in tube 33 flows from the positive pole 34 of battery 22, through the primary coil 35 of the transformer 36, to the plate 37 of tube 33, then to the filament 38, to conductor 28, to the negative side 30 of the plate battery 22. The filaments are lighted from battery 39, as can readily be seen by reference to the drawing. It will be understood that fluctuations of grid voltage of grid 32 will control the plate current through the circuit just described. Fluctuations of the plate current will be picked up by the secondary 40 of the transformer 36, the external circuit of which includes an electro-magnet 41, positioned adjacent an armature 42 pivoted at 43 and carrying a mirror 44. The armature 42 is in the form of a bell crank lever, having an arm 45, the end of which is secured to the center of a hair spring 46. It will be understood, of course, that the armature is very light in mass and very delicately balanced on pivots. The electro-magnet 41 and its associated parts are housed in a recorder device. It is to be understood, of course, that any suitable recording device may be employed, one example, however, being described so that our invention will be more easily understood. An incandescent light 50, which may be lighted from battery 51, is housed in housing 52, which is provided with a lens 53 adapted to focus a point of light upon the mirror 44, which reflects the point of light along the path 54 to photographic film 55, which is stretched in the path of the reflected beam between spools 56 and 57. The film is adapted to move in the direction of the arrow, that is, to be wound by spool 57, which is driven by a motor 59 or in any other suitable manner. A number of different forms of recording instruments may be used, as will be readily understood by those skilled in the art.

It will be understood that we have accomplished the objects of our invention. By means of the low pass filter, undesirable high frequencies are eliminated; by means of the high pass filter, undesirable low frequencies are eliminated. Only the usable, intermediate frequency earth vibrations are recorded upon film 55. Not only is our method an improvement over the known methods of geological exploration, but it enables explorations to be made in certain areas where known methods could not be used. The layers of the earth's crust, near its surface, consist, in many areas of sandy deposits, or of loose unconsolidated soil or river deposits. In areas of this nature, our method is invaluable as the low frequency geological vibrations caused in these layers are limited. It will be understood that, by means of variable capacities 10 and 14, that the frequencies accepted and passed on from the low pass filter and the high pass filter to the amplifier may be varied. The high frequency adjustment is substantially independent of the low frequency adjustment and an adjustment may be made to operate each. It will be understood, of course, that the desired frequency band will vary in different locations and can be determined by those skilled in the art from known knowledge of general geological conditions.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of geological exploration including the steps of creating elastic waves at or near the earth's surface, generating varying electromotive forces in sympathy with the waves produced and resulting from various subsurface geological formations, selecting an electromotive force of a desired frequency range and recording the voltage variation thereof.

2. A method of geological exploration including the steps of generating vibrations in the earth's crust, generating electric currents substantially in sympathy with said vibrations, rejecting undesirable high frequency currents, and recording the resulting current fluctuations.

3. A method of geological exploration including the steps of generating vibrations in the earth's crust, generating electric currents substantially in sympathy with said vibrations, rejecting undesirable low frequency currents and recording the resultant current fluctuations.

4. A method of geological exploration including the steps of generating vibrations in the earth's crust, generating electrical currents substantially in sympathy with said vibrations, rejecting undesirable low frequency currents, rejecting undesirable high frequency currents and recording the resultant current fluctuations.

HAROLD R. PRESCOTT.
FRANK L. SEARCY.